United States Patent
Morgan

(10) Patent No.: US 12,457,222 B1
(45) Date of Patent: Oct. 28, 2025

(54) MANAGING INTEGRITY OF DISTRIBUTED DIGITAL MEDIA

(71) Applicant: Metaglue Corporation, Black Mountain, NC (US)

(72) Inventor: Oliver Frederick Morgan, Black Mountain, NC (US)

(73) Assignee: Metaglue Corporation, Black Mountain, NC (US)

( * ) Notice: Subject to any disclaimer, the term of this patent is extended or adjusted under 35 U.S.C. 154(b) by 148 days.

(21) Appl. No.: 18/484,585

(22) Filed: Oct. 11, 2023

Related U.S. Application Data

(60) Provisional application No. 63/379,280, filed on Oct. 12, 2022.

(51) Int. Cl.
 *H04L 9/40* (2022.01)
 *G06F 16/78* (2019.01)
 *G08B 25/10* (2006.01)

(52) U.S. Cl.
 CPC ............ *H04L 63/123* (2013.01); *G06F 16/78* (2019.01); *G08B 25/10* (2013.01)

(58) Field of Classification Search
 CPC ........ H04L 63/123; G08B 25/10; G06F 16/78
 USPC ....................................................... 726/206
 See application file for complete search history.

(56) References Cited

U.S. PATENT DOCUMENTS

| | | |
|---|---|---|
| 5,809,145 A | 9/1998 | Slik et al. |
| 6,725,274 B1 | 4/2004 | Slik |
| 7,010,697 B2 | 3/2006 | Byrne et al. |
| 7,028,071 B1 | 4/2006 | Slik |
| 7,290,203 B2 | 10/2007 | Emma et al. |
| 7,356,847 B2 | 4/2008 | Byrne et al. |
| 7,546,486 B2 | 6/2009 | Slik et al. |
| 7,565,384 B2 | 7/2009 | Kano |
| 7,590,672 B2 | 9/2009 | Slik et al. |
| 7,624,158 B2 | 11/2009 | Slik et al. |

(Continued)

OTHER PUBLICATIONS

"D-Cinema Packaging—MXF Track File Essence Encryption", The Society of Motion Picture and Television Engineers, Oct. 3, 2006, 25 pages.

(Continued)

*Primary Examiner* — Lan Dai T Truong
(74) *Attorney, Agent, or Firm* — Outside General Counsel LLP; Peter Gordon

(57) ABSTRACT

Tools and techniques are provided to detect faked, or tampered, or unauthorized digital media, such as video, audio, still images, and multimedia clips, and provide and display measures of confidence and validity. A computer system that supports distribution of digital media includes a database that stores information about distributed digital media that enables verification of such digital media. A computer system having access to that database can receive distributed digital media and compute verification data from that digital media. The computed verification data can be compared to the stored information in the database, to determine whether there is any digital media for which the verification data matched the stored information. If there is no match, the computer system can provide feedback that the received digital media cannot be verified. In the event of a match, the computer system can provide feedback that the received digital media has been verified.

12 Claims, 3 Drawing Sheets

(56) References Cited

U.S. PATENT DOCUMENTS

| | | |
|---|---|---|
| 7,743,427 B2 | 6/2010 | Byrne et al. |
| 7,770,230 B2 | 8/2010 | Byrne et al. |
| 8,149,338 B2 | 4/2012 | Rehm et al. |
| 8,726,141 B2 | 5/2014 | Morgan |
| 9,392,302 B2 | 7/2016 | Kelman |
| 11,711,555 B1 * | 7/2023 | Sendurpandian ..... H04L 9/0861 725/31 |
| 2011/0099462 A1 | 4/2011 | Morgan |
| 2012/0159287 A1 | 6/2012 | Odinak |
| 2013/0304761 A1 | 11/2013 | Redlich et al. |
| 2017/0169855 A1 | 6/2017 | D'Autremont |
| 2019/0052939 A1 | 2/2019 | Wang et al. |
| 2020/0019717 A1 | 1/2020 | Steffey et al. |
| 2023/0126851 A1 * | 4/2023 | Bansal ................. H04L 63/123 726/15 |

OTHER PUBLICATIONS

U.S. Patent and Trademark Office, "Non Final Office Action Received", U.S. Appl. No. 12/914,060, Sep. 13, 2013, 7 pages.
U.S. Patent and Trademark Office, "Non-Final Office Action Received", U.S. Appl. No. 17/503,508, Sep. 13, 2023, 27 pages.
U.S. Patent and Trademark Office, "Notice of Allowance Received", U.S. Appl. No. 12/914,060, Feb. 20, 2014, 12 pages.

* cited by examiner

MANAGING INTEGRITY OF DISTRIBUTED DIGITAL MEDIA

CROSS-REFERENCE TO RELATED APPLICATIONS

This application is a non-provisional application of, claiming priority to and the benefit of, U.S. Provisional Patent Application Ser. No. 63/379,280, filed Oct. 12, 2022, entitled "MANAGING INTEGRITY OF DISTRIBUTED DIGITAL MEDIA", pending, which is hereby incorporated by reference.

This application incorporates by reference the following documents: U.S. Patent 8,726,141; U.S. patent application Ser. No. 17/503,508, filed Oct. 18, 2021.

BACKGROUND

One of the challenges in distribution of digital media is allowing the consumer of the digital media to verify that any received digital media originated from the source from which it has been alleged to originate, without modification. This challenge is an issue, for example, with social media platforms, where faked or tampered media, or unauthorized copies of media, can be difficult to spot, disengage from, or fix. Video can be inherently convincing, and consumers have no easy tools to allow them to question what they see. For creators of content, fake or tampered or unauthorized content devalues their brands and impacts their revenue streams.

SUMMARY

This Summary introduces a selection of concepts in simplified form that are described further below in the Detailed Description. This Summary neither identifies features as key or essential, nor limits the scope of the claimed subject matter.

To address these and other problems, tools and techniques are provided to detect faked or tampered or unauthorized digital media, such as video, audio, still images, and multimedia clips, and provide and display measures of confidence and validity.

A computer system that supports distribution of digital media includes a database that stores information about distributed digital media that enables verification of such digital media. A computer system having access to that database can receive distributed digital media and compute verification data from that digital media. The computed verification data can be compared to the stored information in the database, to determine whether there is any digital media for which the verification data matched the stored information. If there is no match, the computer system can provide feedback that the received digital media cannot be verified. In the case of a partial match, the computer system can provide feedback that some of the received digital media can be verified, but some cannot be verified. In the event of a match, the computer system can provide feedback that the received digital media has been verified.

In an example implementation, hash codes of editable units of a digital media stream or data file are used as a form of verification. Given a data file or stream of digital media, including essence data or metadata or both, the computer system accesses the editable units of essence data or metadata and computes a respective hash code for each editable unit of essence data or metadata. The computer system stores the respective hash code in computer storage in a manner associated with the data file or stream, and its corresponding editable unit of essence data or metadata.

Creators of digital media, such as television broadcaster, podcaster, musical artist, and many others, can provide verification information for their digital media to the computer system. When that digital media is distributed, any recipient can use verification information computed from the received digital media to determine, with the computer system, whether the received digital media is authentic. In some instances, that recipient can provide assurance to further recipients to whom the digital media is distributed that the digital media is authentic.

As an example user experience, a person watches a clip of video that purports to be true or authentic or originating from a source. The user can take some action, such as a click on a mouse or other input from an input device, to initiate a request for more information about that clip, such as confirmation that the clip is authentic or originated from the source. In response to such an input, the user's computer accesses this verification system, which generates and provides a report of the level of confidence in the clip. The user can be invited to explore this information further.

As an example, the level of confidence can range from a lowest value, indicative of highly suspicious media, which may be faked, tampered, and unauthorized, to a highest value, indicative of highly reliable content. For example, messages to consumers could be a range of: "minus 100—this clip is definitely unreliable" through "zero—this clip is unknown—be suspicious" all the way to "plus 100—the clip appears to be identical to the original that was created by <originator> and registered on <date and time>". Between these extremes the computer system can detect fakes at increasing levels of sophistication. These could be as simple as "the faker stole the logo and put it on different content", or "the faker re-edited the original to take words out of context" to as sophisticated as "the faker made subtle changes to the images or speech". Similar levels of sophistication can be applied to tampering and unauthorized copying.

The computer system can use any of a wide range of kinds of techniques to verify content, such as watermarks and signatures, including information inserted in the content both visible and invisible, and information derived from the content. When a user requests the computer system to examine some content, the content can be examined at various depths according to the combination of techniques used.

For example, the simplest checks, such as a digital signature of the content, can give an almost instant response without analyzing the content. Simple checks can be used to detect rough hacking and social engineering attacks. For the deeper tests, digital signatures of the original and the suspect clip can be compared frame by frame (up to 60 per second). This can detect attacks such as misleading editing and content substitution. For the most sophisticated tests, the computer system can compare content byte by byte and pixel by pixel. When a fake, or tampering, or unauthorized copy, or other problem is detected, the computer system also can alert the creator/owner of the original content.

In some implementations, tools that generate verification information from content can be provided to content creators. The tools can process the content to generate verification information, such as a digital signature. The tools can insert verification information into the content, such as by signing the content, adding an invisible watermark, or adding a visible watermark, such as in the form of a clickable icon, or any combination of these. For content creators that generate revenue based on their content, such a broadcasters, the visible watermark (such as an icon) can be included in their regular broadcast and online presence. A website can be provided to allow the public to verify content they receive. Such a website can generate signatures for comparison, or detect watermarks, to validate the content, and can display a measure of confidence or additional proof points for content integrity and provenance.

Using such a system, content creators can register their video content and obtain a signed copy with a verification icon, which then can be distributed through various channels or on various platforms, such as social media platforms. Content creators or their partners or distributors can add metadata when registering content to enable enhanced verification. Consumers of content, such as a social media viewer, can see the verification icon on signed content, and know it was signed and should not be fake, tampered, or unauthorized. Such consumers can request further verification of the content, for example by simply clicking on a verification icon. Consumers can access metadata through the content registration site, to have more confidence in the content.

These tools and techniques may be embodied as a computer system, as a component of such a computer system, as a process performed by such a computer system or a component of such a computer system, or as an article of manufacture including computer storage in which computer program code is stored and which, when processed by the processing system(s) of one or more computers, configures the processing system(s) of the one or more computers to provide such a computer system or a component of such a computer system.

The following Detailed Description references the accompanying drawings which form a part of this application, and which show, by way of illustration, specific example implementations. Other implementations may be made without departing from the scope of the disclosure.

DETAILED DESCRIPTION

Figure 1:
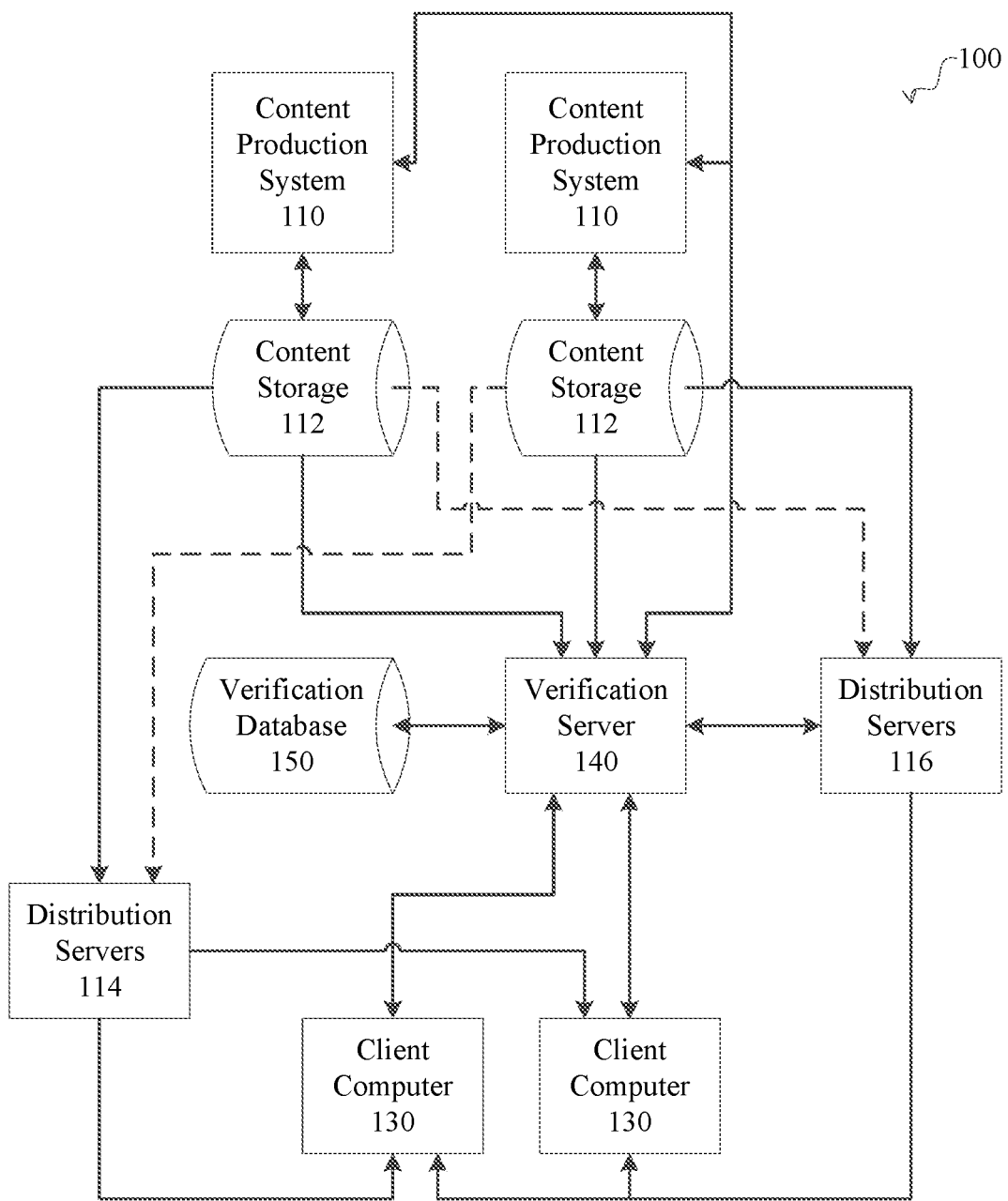
FIG. 1 is a block diagram of an example environment for digital media distribution using a verification system.

A block diagram of an example environment for digital media distribution using a verification system is shown in FIG. 1. Some components of this system can incorporate systems and techniques describe in U.S. Patent 8,726, 141 and U.S. patent application Ser. No. 17/503,508, filed Oct. 18, 2021, which are hereby incorporated by reference.

In FIG. 1, the overall system includes one or more content production systems 110, typically a plurality of distinct content production systems, which are sources from which digital media content is generated. A content production system typically includes a combination of client computers, server computers, computer storage, media captures devices and media output devices, and various tools for capturing, managing, editing, and distributing digital media content. Typically, each content creator has its own content production system 110 and its own corresponding content storage 112. Thus, the system has one or more content storage systems 112, typically a plurality of distinct content storage systems.

Content creators distribute their digital media content by providing access to streams or data files containing the digital media content to a distribution channel. A distribution channel can include one or more distribution servers, e.g., 114, 116, each of which can be implemented using one or more respective server computers. A distribution channel, e.g., 114, can include any of a number of ways to communicate digital media content to consumers of that content, such as a social media platform, streaming over a computer network, or cable or satellite distribution, and thus any number of distribution servers.

Consumers of content access distribution channels through client computers 130. A client computer connects to a distribution server 114 or 116 to receive digital media content. The client computer typically includes one or more computer programs that can present digital media content through one or more output devices connected to the client computer.

To allow their digital media content to be verified, content creators can cause their content production systems and content storage systems to communicate with a verification server 140. The verification server 140 processes digital media content to generate verification information which is stored in a verification database. In some implementations, the verification information is generated by a computer controlled by the content creator, and then transmitted to the verification server 140. In some implementations, the content creator causes the content to be transmitted to the verification server 140 to generate the verification information. The verification database stores, for example, an identifier for an item of digital media content, and, for subunits of that item, such as a segment, clip, editable unit, frame or other subunit, corresponding verification information for that subunit. There can be multiple types of verification information, and multiple types of subunits for which verification information is generated.

In some implementations, the verification information can include a digital signature of the digital media content. In some implementations, the verification information can include a watermark inserted in the digital media content, which may be perceivable or not perceivable by humans. In some implementations, the verification information can include a hash of the digital media content. Different subunits of the digital media content can have different verification information.

A client computer 130 or a distribution server 116 or both can connect to a verification server 140 to verify, validate, authenticate, or otherwise submit for review, any received digital media content. In some implementations, the distribution server 116 may connect with the verification server 140 to validate digital media content before distribution of that content to a client computer 130. In some implementations, the distribution server 116 may connect with the verification server 140 to add verification information related to the distribution channel.

Figure 2:
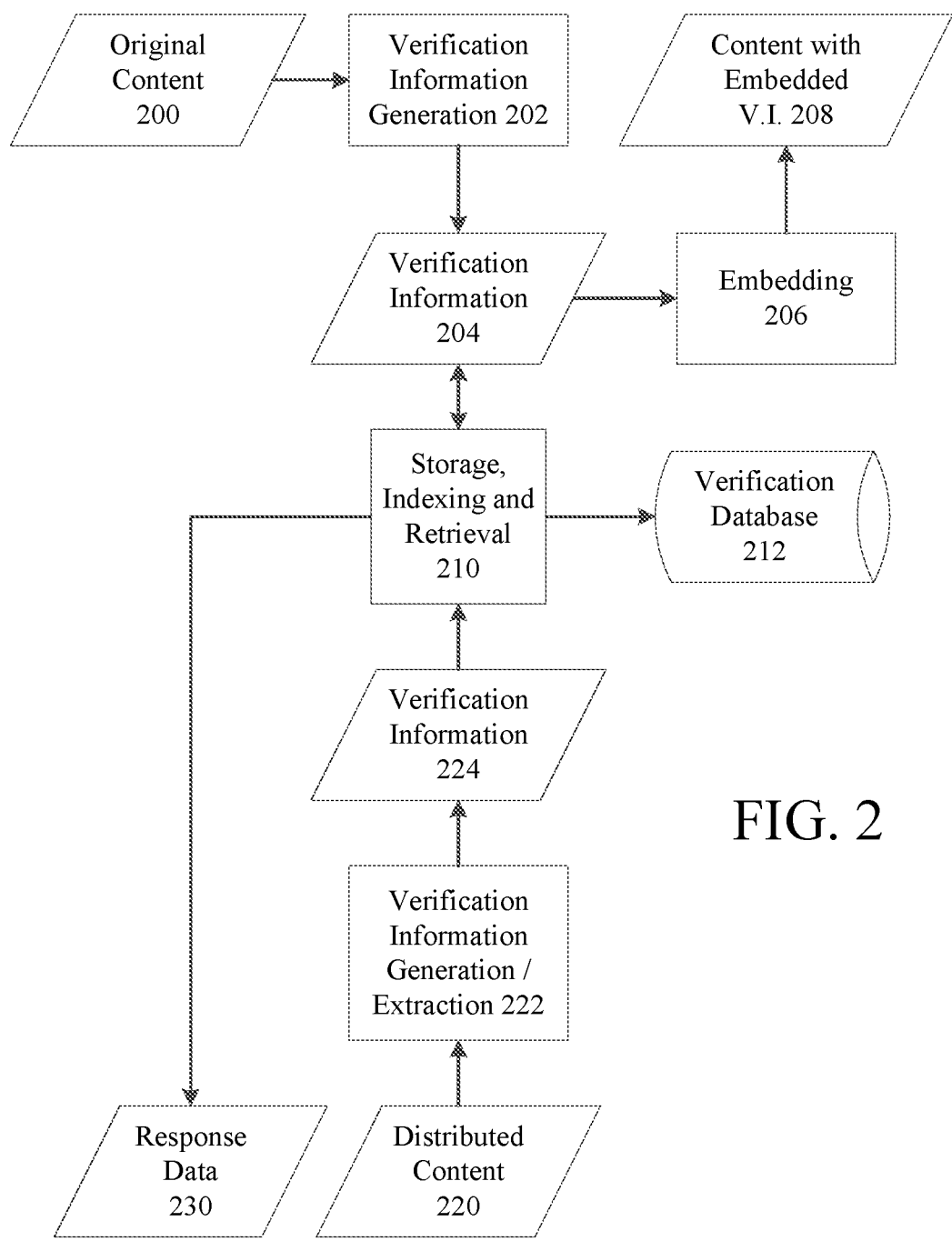
FIG. 2 is a data flow diagram of an example implementation of a verification system.

A data flow diagram of an example implementation of a verification system is shown in FIG. 2.

Original digital media content 200 is input to a verification information generation module 202, which generates the verification information 204. In some implementations, the verification information is embedded into the original digital media content using and embedding module 206, which produces the content 208 with the embedded verification information (V.I.).

The verification information 204 is exchanged with a storage, indexing, and retrieval system 210, which can be implemented using a database management system, to store the verification information 204 in a verification database 212.

To process distributed digital media content 220, the received content is processed by a verification information generation/extraction tool 222 to obtain verification information 224 from the distributed content. In some implementations, such as where the verification information is a digital signature, a digital signature can be computed. In some implementations, such as where the verification information is an embedded watermark, any watermark can be extracted.

The verification information 224 is input to the storage, indexing, and retrieval module 210, which uses that information to look up the corresponding verification information in the verification database 212, and provide a response 230. If the received verification information 224 does not have matching verification information 204 in the verification database 212, then the response 230 can communicate that the distributed content 220 cannot be verified as authentic. If the received verification information 224 completely matches, then the response 230 can communicate that the distributed content 220 is verified as authentic. With more complex verification information and processing, it is possible that the received verification information 224 partially matches, in which case the response 230 can communicate that the distributed content 220 is questionable.

In an example implementation, hash codes of editable unit of a digital media stream or data file are used as a form of verification. Given a data file or stream of digital media, including essence data or metadata or both, the computer system accesses the editable units of essence data or metadata and computes a respective hash code for each editable unit of essence data or metadata. The computer system stores the respective hash code in computer storage in a manner associated with the data file or stream, and its corresponding editable unit of essence data or metadata.

Creators of digital media, such as television broadcaster, podcaster, musical artist, and many others, can provide verification information for their digital media to the computer system. When that digital media is distributed, any recipient can use verification information computed from the received digital media to determine, with the computer system, whether the received digital media is authentic. In some instances, that recipient can provide assurance to further recipients to whom the digital media is distributed that the digital media is authentic.

As an example user experience, a person watches a clip of video that purports to be true or authentic or originating from a source. The user can take some action, such as a click on a mouse or other input from an input device, to initiate a request for more information about that clip, such as confirmation that the clip is authentic or originated from the source. In response to such an input, the user's computer accesses this verification system, which generates and provides a report of the level of confidence in the clip. The user can be invited to explore this information further.

As an example, the level of confidence can range from "minus 100—this clip is definitely unreliable" through "zero—this clip is unknown—be suspicious" all the way to "plus 100—the clip appears to be identical to the original that was created by <originator> and registered on <date and time>". Between these extremes the computer system can detect fakes at increasing levels of sophistication. These could be as simple as "the faker stole the logo and put it on different content", or "the faker re-edited the original to take words out of context" to as sophisticated as "the faker made subtle changes to the images or speech". Similar levels of sophistication can be applied to tampering and unauthorized copying.

The computer system can use any of a wide range of kinds of techniques to verify content, such as watermarks and signatures, including information inserted in the content both visible and invisible, and information derived from the content. When a user requests the computer system to examine some content, the content can be examined at various depths according to the combination of techniques used.

For example, the simplest checks, such as a digital signature of the content, can give an almost instant response without analyzing the content. Simple checks can be used to detect rough hacking and social engineering attacks. For the deeper tests, digital signatures of the original and the suspect clip can be compared frame by frame (up to 60 per second). This can detect attacks such as misleading editing and content substitution. For the most sophisticated tests, the computer system can compare content byte by byte and pixel by pixel. When a fake, or tampering, or unauthorized copy, or other problem is detected, the computer system also can alert the owner of the original content.

In some implementations, tools that generate verification information from content can be provided to content creators. The tools can process the content to generate verification information, such as a digital signature. The tools can insert verification information into the content, such as by signing the content, adding an invisible watermark, or adding a visible watermark, such as in the form of a clickable icon, or any combination of these. For content creators that generate revenue based on their content, such a broadcasters, the visible watermark (such as an icon) can be included in their regular broadcast and online presence. A website can be provided to allow the public to verify content they receive. Such a website can generate signatures for comparison, or detect watermarks, to validate the content, and can display a measure of confidence or additional proof points for content integrity and provenance.

Figure 3:
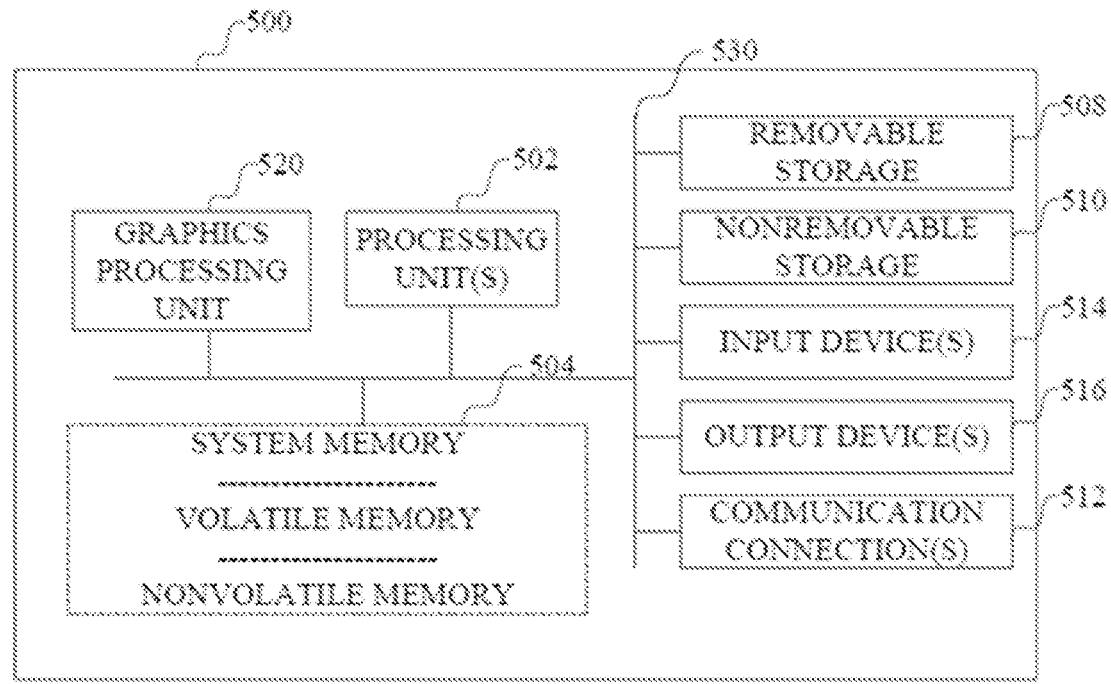
FIG. 3 is a block diagram of an example computer.

Having now described an example implementation, FIG. 3 illustrates an example of a general-purpose computing device with which can be used to implement a computer system as described herein. This is only one example of a computing device and is not intended to suggest any limitation as to the scope of use or functionality of such a computing device. The computer system described above can be implemented in one or more computer programs executed on one or more such computing device, such as a general-purpose computer as shown in FIG. 3.

FIG. 3 is a block diagram of a general-purpose computer which processes computer program code using a processing system. Computer programs on a general-purpose computer typically include an operating system and applications. The operating system is a computer program running on the computer that manages and controls access to various resources of the computer by the applications and by the operating system, including controlling execution and scheduling of computer programs. The various resources typically include memory, storage, communication interfaces, input devices, and output devices. Management of such resources by the operating system typically includes processing inputs from those resources, scheduling use of those resources, and providing outputs from those resources.

Examples of such general-purpose computers include, but are not limited to, larger computer systems such as server computers, database computers, desktop computers, laptop and notebook computers, as well as mobile or handheld computing devices, such as a tablet computer, handheld computer, smart phone, media player, personal data assistant, audio or video recorder, or wearable computing device.

With reference to FIG. 3, an example computer 300 comprises a processing system including at least one processing unit 302, also called a processing device, and a memory 304. The computer can have multiple processing units 302 and multiple devices implementing the memory 304. A processing unit 302 can include one or more processing cores (not shown) that operate independently of each other. Additional co-processing units, such as graphics processing unit 320, also can be present in the computer. The memory 304 may include volatile devices (such as dynamic random access memory (DRAM) or other random access memory device), and non-volatile devices (such as a read-only memory, flash memory, and the like) or some combination of the two, and optionally including any memory available in a processing unit. Other memory such as dedicated memory or registers also can reside in a processing unit. This configuration of memory is illustrated in FIG. 3 by dashed line 304. The computer 300 may include additional computer storage (removable or non-removable) including, but not limited to, magnetically recorded or optically-recorded disks or tape. Such additional computer storage is illustrated in FIG. 3 by removable storage 308 and non-removable storage 310. The various components in FIG. 3 typically are interconnected by an interconnection mechanism, such as one or more buses 330.

A computer storage medium is any medium in which data can be stored in and retrieved from addressable physical storage locations by the computer. Computer storage media includes volatile and nonvolatile memory devices, and removable and non-removable storage devices. Memory 304, removable storage 308 and non-removable storage 310 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 300 may also include communications connection(s) 312 that allow the computer to communicate with other devices over a communication medium. Communication media typically transmit computer program code, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media include any non-wired communication media that allows propagation of signals, such as acoustic, electromagnetic, electrical, optical, infrared, radio frequency and other signals. Communications connections 312 are devices, such as a network interface or radio transmitter, that interface with the communication media to transmit data over and receive data from signals propagated through communication media.

The communications connections can include one or more radio transmitters for telephonic communications over cellular telephone networks, or a wireless communication interface for wireless connection to a computer network. For example, a cellular connection, a Wi-Fi connection, a Bluetooth connection, and other connections may be present in the computer. Such connections support communication with other devices, such as to support voice or data communications.

The computer 300 may have various input device(s) 314 such as various pointer (whether single pointer or multi-pointer) devices, such as a mouse, tablet and pen, touchpad and other touch-based input devices, stylus, image input devices, such as still and motion cameras, audio input devices, such as a microphone. The computer may have various output device(s) 316 such as a display, speakers, printers, and so on, also may be included. These devices are well known in the art and need not be discussed at length here.

The various storage 310, communication connections 312, output devices 316 and input devices 314 can be integrated within a housing of the computer, or can be connected through various input/output interface devices on the computer, in which case the reference numbers 310, 312, 314 and 316 can indicate either the interface for connection to a device or the device itself, as the case may be.

An operating system of the computer typically includes computer programs, commonly called drivers, which manage access to the various storage 310, communication connections 312, output devices 316 and input devices 314. Such access can include managing inputs from and outputs to these devices. In the case of communication connections, the operating system also may include one or more computer programs for implementing communication protocols used to communicate information between computers and devices through the communication connections 312.

Each component (which also may be called a "module" or "engine" or "component' or "tool" or the like), of a computer system and which operates on one or more computers, can be implemented as computer program code processed by the processing system(s) of one or more computers. Computer program code includes computer-executable instructions or computer-interpreted instructions, such as program modules, which instructions are processed by a processing system of a computer. Such instructions define routines, programs, objects, components, data structures, and so on, that, when processed by a processing system, instruct the processing system to perform operations on data or configure the processor or computer to implement various components or data structures in computer storage. A data structure is defined in a computer program and specifies how data is organized in computer storage, such as in a memory device or a storage device, so that the data can accessed, manipulated, and stored by a processing system of a computer.

It should be understood that the subject matter defined in the appended claims is not necessarily limited to the specific implementations described above. The specific implementations described above are disclosed as examples only.

What is claimed is:

1. A computer system, comprising:
  a verification database storing information for a plurality of items of digital media content, wherein each item has a respective identifier, respective metadata describing the digital media content, and respective verification information for the item;
  a server computer accessing the verification database and configured to:
    receive and store in the verification database, for each of the plurality of items of digital media content, the respective identifier, the respective metadata describing the digital media content, and the respective verification information for the item;

receive, for items of distributed media content, respective verification information for the item;

using the respective verification information from an item of distributed media content, access the verification database to retrieve at least one of the respective identifier, the respective metadata, or the respective verification information of a matching item.

2. The computer system of claim 1, wherein, using the respective verification information, the server computer is configured to:

perform a first test to determine whether the item of distributed media content corresponds to an item of the plurality of items of digital media content;

in response to the first test indicating that the item of distributed media content corresponds to an item of the plurality of items of digital media content, perform a subsequent test to determine whether the item of distributed media content is reliable.

3. The computer system of claim 1, wherein, using the respective verification information, the server computer is configured to:

perform a first test to determine whether a portion of the item of distributed media content matches an item of the plurality of items of digital media content;

in response to the first test indicating that an item of distributed media content does or does not match an item of the plurality of items of digital media content, perform one or more subsequent tests to determine whether other editable units, sections, or portions of the distributed media content are reliable.

4. The computer system of claim 1, wherein, using the respective verification information, the server computer is configured to:

perform a first test to determine whether a portion of the item of distributed media content matches an item of the plurality of items of digital media content;

in response to the first test indicating that an item of distributed media content does or does not match an item of the plurality of items of digital media content, perform one or more additional tests on the item of distributed content to refine findings of previous tests.

5. A computer system, comprising:

a verification database storing information for a plurality of items of digital media content, wherein each item has a respective identifier, respective metadata describing the digital media content, and respective verification information for the item;

a server computer accessing the verification database and configured to:

receive, for items of distributed media content, respective verification information for the item;

using the respective verification information from an item of distributed media content, access the verification database to retrieve at least one of the respective identifier, the respective metadata, or the respective verification information of a matching item; and communicate to a client computer an indication of whether the item of distributed media content is reliable.

6. A computer system, comprising:

a verification database storing information for a plurality of items of digital media content, wherein each item has a respective identifier, respective metadata describing the digital media content, and respective verification information for the item;

a server computer accessing the verification database and configured to, using verification information from an item of distributed media content, access the verification database to determine whether the verification database includes a matching registered item of digital media content; and a client computer having a user interface to present items of distributed media content on a presentation device and being configured to:

in response to an input from a user in connection with an item of distribute media content, communicate with the server computer to cause the server computer to receive verification information and request verification of the distributed media content;

receive and present through the user interface information indicative of whether the item of distributed media content is reliable.

7. The computer system of claim 6, wherein the distributed media content includes visible verification information indicative of whether distributed media content is registered with the verification database.

8. The computer system of claim 7, wherein, in response to the information indicative of whether the item of distributed media content is reliable, the client computer presents, through the user interface, an option for the user to select to have further analysis of the distributed media content.

9. The computer system of claim 6, wherein the client computer provides digital media content from the item of distributed media content to the server computer for the server computer to generate verification information for the item of distributed content.

10. The computer system of claim 6, wherein distributed media content is unreliable if the distributed media content is one or more of unknown, faked, tampered, or unauthorized.

11. The computer system of claim 10, wherein, in response to the distributed media content being determined to be one or more of faked, tampered, or unauthorized, sending information to a computer system of an owner of registered media content of which the distributed media content is faked, tampered, or unauthorized.

12. The computer system of claim 1, wherein, using the respective verification information, the server computer is configured to:

perform a first test to determine whether a portion of the item of distributed media content corresponds to an item of the plurality of items of digital media content;

in response to the first test indicating that the portion of the item of distributed media content corresponds to an item of the plurality of items of digital media content, perform a subsequent test to determine whether a remainder of the item of distributed media content is reliable.

\* \* \* \* \*